United States Patent [19]

Hall

[11] Patent Number: 4,857,578

[45] Date of Patent: Aug. 15, 1989

[54] WOOD COATING COMPOSITION FROM ALKYD RESIN, PTFE AND MICROCRYSTALLINE WAX

[75] Inventor: Robert M. Hall, Des Plaines, Ill.

[73] Assignee: Rust-Oleum Corporation, Evanston, Ill.

[21] Appl. No.: 226,225

[22] Filed: Jul. 29, 1988

[51] Int. Cl.$^4$ .......................... D21H 1/48; D21H 1/36; D21H 1/40

[52] U.S. Cl. .................................. 524/488; 524/487; 524/513; 523/500; 106/245

[58] Field of Search .................... 524/487, 488, 513; 523/500

[56] References Cited

U.S. PATENT DOCUMENTS

| | | | |
|---|---|---|---|
| 3,171,825 | 3/1965 | Mark | 524/513 |
| 4,554,303 | 11/1985 | Petke et al. | 524/488 |
| 4,600,441 | 7/1986 | Goldberg et al. | 526/245 |

FOREIGN PATENT DOCUMENTS 0120896  7/1983  Japan .................... 524/488

*Primary Examiner*—John Kight
*Assistant Examiner*—C. Azpuru
*Attorney, Agent, or Firm*—Allegretti & Witcoff, Ltd.

[57] ABSTRACT

A water repellent coating for wood substrates is presented. The coating comprises a highly dispersed mixture of polytetrafluoroethylene, alkyd resin and microcrystalline wax. Dispersion of the polytetrafluoroethylene and microcrystalline wax as discrete particles prevents delamination of successive coats while providing intercoat adhesion. Also presented is a process for the preparation of water repellent wood coatings that prohibits microcrystalline wax breakdown.

10 Claims, No Drawings ically used in wood treating compositions to provide some degree of water repellency and to aid paint holdout. Such resins are polyesters, polyhydroxyl, alcohols and polycarboxyl acids chemically combined with various drying, semi-drying and nondrying oils in different proportions.

WOOD COATING COMPOSITION FROM ALKYD RESIN, PTFE AND MICROCRYSTALLINE WAX

FIELD OF INVENTION

This invention relates to a novel coating composition for the protection of wood substrates. More particularly, the invention relates to a protective coating having water resistant properties. The protective coating of the invention is characterized by a novel uniformly dispersed mixture of alkyd resin, polytetrafluoroethylene and microcrystalline wax. Providing a high dispersion of a specific quantity of microcrystalline wax prevents delamination of successive applications of the protective coating. The invention further relates to a process for preparing a water repellant wood paint.

INFORMATION DISCLOSURE

There has long been a need for water repellent compositions. Such compositions find use on a variety of substrates. One area in particular where water repellents have found use has been in the treatment of wood. This is especially true for wood which is exposed to the outside environment. When wood is continually contacted with water and subjected to changing weather conditions, it will swell, crack and eventually rot. It has been long known in the art to protect wood using wood preservative containing compositions. Such compositions were applied as single coat stains or by pressure treatment with wood preservative agents. After the application of such prior art water repellent formulations it was often necessary to apply a paint coat to achieve a desired aesthetic effect. Prior art compositions containing wax compounds suffered the disadvantage of being applicable only to single coat application. This was because high concentration of wax at the surface of the coating would prevent successive layers from adhering to each other. This effect is known in the art as delamination.

The use of waxes or polytetrafluoroethylene (PTFE) as a component in coatings for various substrates, including wood, is well known in the art. U.S. Pat. No. 3,055,852 (Yose) discloses a dispersion of finely divided PTFE that can be applied to a substrate, such as wood, without the application of heat to cure the film coating. The dispersion comprises a mixture of PTFE and cellulose ether that is present in sufficient quantity to act as a continuous phase for securing the PTFE particles to the substrate surface. The dispersions may be formed with a variety of dispersing media including water or organic solvents capable of dissolving the cellulosic ethers.

The use of waxes as a water repellent material is disclosed in U.S. Pat. No. 2,231,486 (Taggart). The invention teaches that a glass-like water repellent film can be obtained by application of a composition containing crystallizable mineral waxes dissolved in an organic solvent and containing a thickening ingredient for controlling the crystallization of the mineral wax. Similarly, in the U.S. Pat. No. 4,360,385 (Grunewalder) a water repellent treatment composition for wood is disclosed comprising alpha olefins or paraffins and at least one material selected from the group consisting of a wood preservative, alkyd resin, organic ionizable compound, and an organic solvent.

In summary, the wood coating art has not recognized the highly dispersed mixture of alkyd resin, PTFE and microcrystalline wax that comprises the wood coating of this invention. Further, the art has not recognized how to prevent delamination of successive wood protection coatings containing a wax component. The instant invention provides a coating that not only has excellent water repellent properties but also eliminates the problem of delamination. By careful selection of the quantity and type of microcrystalline wax and the method of preparation, the coatings of this invention exhibit superior intercoat adhesion properties. Dispersing of the microcrystalline wax as small discrete particles within the coating composition has now been found to prevent delamination.

SUMMARY OF THE INVENTION

The present invention is directed to a novel protective coating composition particularly formulated for application to wood. More specifically, this alkyd resin based coating comprises polytetrafluoroethylene (PTFE) and microcrystalline wax uniformly dispersed in an organic solvent.

It is a principle object of this invention to provide a protective coating composition that combines the characteristics of a alkyd base paint and a conventional water repellent coating.

Another object of this invention is to provide a protective coating that resists delamination upon successive applications of the protective coating.

Yet another object of the present invention is to provide a process for the preparation of a protective wood coating that results in a uniformly dispersed mixture of PTFE and microcrystalline wax without breakdown of the wax component.

Accordingly, a broad embodiment of the invention is directed to a protective coating for wood having water resistant properties comprising an alkyd resin, polytetrafluoroethylene and microcrystalline wax uniformly dispersed in an organic solvent.

Another aspect of the invention is a process for the preparation of a uniformly dispersed protective coating for wood having water resistant properties, comprising, in combination, the steps of (a) preparing a first mixture comprising organic solvent, polytetrafluoroethylene, pigment, and alkyd resin;

(b) dispersing the first mixture to produce a uniform dispersion of polytetrafluoroethylene, pigment and alkyd resin having a dispersion of at least 4 Hegman;

(c) preparing a second mixture comprising organic solvent and microcrystalline wax;

(d) quickly slurrying the second mixture at a temperature less than 130° F. and at a shear sufficient to ensure a uniformly dispersed mixture without effecting congealing of the microcrystalline wax; and (e) combining the second mixture with the first mixture with blending to a uniform dispersion.

These as well as other embodiments of the present invention will become evident from the following, more detailed description of some preferred embodiments.

DETAILED DESCRIPTION OF THE PREFERRED EMBODIMENTS

The protective coating of this invention contains an alkyd resin. Alkyd resins have been conventionally used in wood treating compositions to provide some degree of water repellency and to aid paint holdout. Such resins are polyesters, polyhydroxyl, alcohols and polycarboxyl acids chemically combined with various drying, semi-drying and nondrying oils in different proportions.

Thus, for example, the alkyd resins are made from polycarboxylic acids such as phthalic acid, maleic acid, fumaric acid, isophthalic acid, succinic acid, adipic acid, azelaicacid, sebacic acid as well as from anhydrides of such acids, where they exit. The polyhydric alcohols which are reacted with the polycarboxylic acid include glycerol, trimethylolethane, trimethylolpropane, pentaerythritol, sorbitol mannitol, ethylene glycol, diethylene glycol and 2,3-butylene glycol. The alkyd resins are produced by reacting the polycarboxylic acid and the polyhydric alcohol together with a drying, semi-drying or nondrying oil in proportions depending upon the properties desired. The oils are coupled into the resin molecule by esterification during the manufacturing and become an integral part of the polymer. The oil is fully saturated or predominately unsaturated. The fully saturated oils tend to give a plasticizing effect to the alkyd, whereas the predominately unsaturated oils tend to crosslink and dry rapidly with oxidation to give more tough and durable alkyd resins. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties.

The alkyd resins preferred for the protective coating of this invention includes any ambient curing alkyd or modified alkyl resin that can function as film former. Most preferred are medium to long oil length resins which are soluble in aliphatic or aromatic hydrocarbons. A medium oil length resin is defined as a resin having 50 to 60 percent of the solids (i.e. nonvolatile components) as oil. A long oil length resin is one where greater than 60 percent of the solids is oil. Especially suitable for use in this invention is a medium oil length soya alkyd resin synthesized from pentaerythritol, phthalic anhydride and soybean oil. It is preferred that the resin have a viscosity in the range of from 2000 to 4000 centipoises (measured at 100 rpm and 77° F.) and a thixotropic quotient of from 1.5 to 1.9. The thixotropic quotient is used to characterize the rheology of thixotropic resins by measuring a shear viscosity at high shear rate (100 rpm) and after allowing the resin to rest, determining the viscosity at low shear rate (10 rpm). The thixotropic quotient, the ratio of the low shear rate viscosity to the high shear rate viscosity, is a measure of the rate of viscosity recovery in the thixotropic resin. The quantity of alkyd resin in the coating is preferable in the range from about 15 to about 50 weight percent, more preferably from about 20 to about 40 weight percent of the coating.

The coatings of this invention can be characterized as water repellent paint. Paints by conventional definition contain organic or inorganic pigments that impart coloration and decorative effects to the resultant coating. Accordingly, one embodiment of the present invention contains an inorganic pigment. Inorganic pigments belong to numerous chemical classes including elements, oxides, sulfides, chromates, silicates, phosphates, and carbonates. Available pigments are whites, e.g. titanium dioxide, zinc oxide, and zinc sulfide; reds, e.g., cadmium sulfide, selenite, and iron oxide; yellows, e.g., cadmium sulfide, lead chromate, and iron oxide; greens, e.g., chromium oxide green; blues, e.g., iron, ultramarine, and cobalt blues; and blacks, e.g., carbon black. There are also metallic flakes and many natural and synthetic extender pigments, e.g., kaolinite, mica, calcium carbonate, silica, barium sulfate, and talc. Pigments can be black, colored, colorless or metallic. Color production results from the pigments selective absorbtion of visible light. Generally, pigments are solids of small particle size and remain insoluble or relatively so in the medium in which they are dispersed. Pigments also provide protective functions, for example, by absorbing UV and other radiation which prevents degradation and embrittlement of film or substrate. They also may increase durability and through chemical integrations with substrates, retard corrosion. The gloss of the coatings can be adjusted with various pigments including, calcium carbonate. Similarly, sag resistance and anti-settling characteristics of the coating can be adjusted with the addition of appropriate amounts of pigments like bentonitic clays.

The solvent that is used to solubilize the alkyd resin and to provide the medium for the dispersion of the PTFE, microcrystalline wax, and pigments may be any of the organic evaporative solvents that are well known to the art. For example, suitable solvents include petroleum distillates of relatively high saturation in the gasoline-kerosene boiling range, e.g., mineral spirits, kerosene and VM & P naphtha. Also suitable as solvents for the protective coating are light aromatic hydrocarbons and substituted derivatives including toluene and mixed xylenes. The preferred solvent is selected from the group consisting of mineral spirits, VM & P naphtha, mixed xylenes, and toluene. The preferred quantity of solvent is in the range from about 25 to about 50 weight percent, most preferably in the range from about 30 to about 45 weight percent of the coating formulation.

The microcrystalline wax and PTFE components of the protective coating reduce the surface tension of the coating and as a result do not allow for surface wetting. These active ingredients are responsible for the extremely low moisture vapor transmission rate, as measured by ASTM recognized tests, that is observed when the coating is applied to a wood substrate.

Microcrystalline waxes are used in the coatings of this invention as opposed to conventional mineral waxes. On the microscopic level, these microcrystalline particles are composed of colloidal microcrystals connected by molecular chains. The process of preparation of these microcrystalline structures involves breaking up of the network of microcrystals and separating them by mechanical agitation. The average particle size range of these waxes is from about 2.0 to about 10 microns. Microcrystalline waxes from extremely stable gels of much higher viscosity than normal wax. Microcrystallline was also have a much higher molecular weight than that of normal waxes averaging about 500 to 800, about twice that of paraffin.

The preferred microcrystalline wax of this invention is selected from the group consisting of Fischer-Tropsch waxes, polyethylene waxes, polypropylene waxes, and combinations thereof. Fischer-Tropsch waxes are synthetic basic straight chain hydrocarbon waxes produced by the Fischer-Tropsch process. The most preferred microcrystalline wax is polypropylene wax. It has been found that to prevent delamination of successive layers of the protective coating a preferred level of microcrystalline wax must be present. Insufficient wax will result in the coating having poor water repellency, whereas excessive levels of wax will prevent adhesion of successive layers of the coating. Accordingly, the preferred quantity of microcrystalline wax in the coating is from about 0.2 to about 5.0 weight percent, most preferably from about 0.3 to about 1 weight percent of the coating.

Also responsible for the high degree of water repellency exhibited by the coating of the invention is the presence of PTFE. Although not completely understood and not wishing to be bound to a single theory it is believed that intercoat adhesion failure is prevented when both the wax and the PTFE are uniformly dispersed, each as distinct physical particles. In other words, it is not desired that a chemical or intimate physical relationship exist between the wax and the PTFE. A suitable PTFE for this invention is a nonaqueous particulate solid preferably having an average particle size less than 30 microns, preferably less that 1.0 micron. The particles of PTFE should be small enough to give the coating integrity after application to a wood substrate. The PFTE is present in the coating in a preferred concentration of from about 0.01 to about 0.1% by weight of the coating. A most preferred concentration of PTFE is from about 0.01 to about 0.05 wt%. A suitable PTFE is marketed under the trade name Teflon 7C.

As mentioned, coatings of this invention are especially useful when applied to wood. The coatings can be applied by any conventional method including flow coating, roll coating, brushing, dipping, and spraying. Once applied the solvent component of the coating is permitted to evaporate at ambient temperatures causing the alkyd resin to form a film leaving the desired uniformly dispersed PTFE, microcrystalline wax, and pigments on the surface of the coated wood. The protective coatings of this invention can be applied to all types of wood including hard and soft woods, as well as wood products, such as hardboard and plywoods.

The preferred method of application is brushing. The adhesion of the coating is enhanced, in general, by preliminary roughening up the wood surface, such as by mechanical abrasion. The coatings are applied in relatively thin layers and even where a relative thick coating is desired, the coating is preferably built by applying successive thin layers. By this procedure, coatings having a thickness as high as about 5 dry mils can be easily prepared and the benefits of improved water repellency, though nonwettability are obtained when the coatings have a thickness in the range of from about 1 to about 5 dry mils. For most purposes a coating having a thickness in the range of about 1 to about 2 dry mils is satisfactory.

The protective coatings of this invention can be prepared by any suitable manufacturing procedure known to the art and using conventional mixing or blending equipment. Regardless of the particular manufacturing scheme chosen, it is most important to employ a method that results in a highly uniform dispersion of the microcrystalline wax and PTFE while simultaneously preventing breakdown of the microcrystalline wax. Wax breakdown occurs if the wax is subjected to a high shear, an increased temperature or combination of both. Wax breakdown is characterized by congealing of the wax. It is important that the wax not be subjected to a temperature in excess of 130° F. It is well known that successive coatings of alkyd resin alone will adhere readily to each other, whereas a coating of alkyd resin applied to a wax surface will not adhere to the wax surface. This delamination of successive coats is known as intercoat adhesion failure. In order to achieve the water repellent characteristics of wax and the intercoat adhesion properties of alkyd resin, both of which are exhibited by the coatings of this invention, it is necessary to prepare a highly uniform dispersion of the wax within an admixture of PTFE and alkyd resin. Uniform dispersion produces anchor points of resin that coexist with the wax and PTFE particles at the surface of the coating. Anchor points of resin are important because they allow resin in a successive coat to adhere to the first coat. Congealing of the wax caused by wax breakdown will prevent the formation of anchor points and will result in intercoat adhesion failure. A preferred method of formulating the constituents of the coating to achieve the proper proportions described above is to prepare a first mixture comprising alkyd resin, PTFE, pigment and solvent. The components in the first mixture are dispersed by any means known to the art to produce highly dispersed particles having a dispersion of at least 4 Hegman, preferably is in the range of from about 5 to about 6 Hegman. Hegman is a unit of measure commonly used in the paint industry having a scale from 8 to 0 Hegman (2 Hegman=75 microns and 4 Hegman=50 microns). A preferred dispersing method is grinding using a media mill. A second mixture is then prepared comprising microcrystalline wax and solvent. Alternatively, alkyd resin may be added to the second mixture. The second mixture is quickly slurried to avoid wax breakdown. and then added to the first mixture to form the desired coating composition. However, it may be necessary in some circumstances to add additional solvent and alkyd resins to adjust the viscosity and gloss of the coating.

In order to more fully demonstrate the attendant advantages arising from the present invention the following examples are set forth. It is to be understood that the following are by way of example only and are not intended as an undue limitation on the otherwise broad scope of the invention.

EXAMPLE 1

A wood paint composition in accordance with the invention was prepared in the following manner. To a first vessel was added the quantity of components listed in Table 1. These components were dispersed by grinding to form a first mixture having a particle size of from about 5 to 6 Hegman. The dispersed mixture in the first vessel was transferred to a thin down tank. To the first vessel was added 5 gallons of mineral spirits and 4.4 pounds of microcrystalline polypropylene wax. To prevent wax breakdown caused by congealing, the mixture of mineral spirits and microcrystalline wax was quickly slurred for 5 minutes and then transferred to the thin down tank where it was admixed with the first mixture. To the resultant mixture in the thin down tank was added the quantity of components shown in Table 2. Finally, the viscosity and gloss were adjusted by adding additional quantities of resin and solvent, respectively. The resultant wood paint composition was ebony black in color and exhibited excellent intercoat adhesion and water repellency.

TABLE 1

| Medium oil length soya alkyd resin | 30 gal. |
|---|---|
| PTFE (Teflon 7C) | 46 gm. |
| Mineral Spirits | 2 gal. |
| Carbon Black | 21.3 lbs. |
| Calcium Carbonate | 155.4 lbs. |
| Magnesium Silicate | 49.7 lbs. |
| Dispersing Agent | 0.2 gal. |
| Mildewcide | 3.5 lbs. |

TABLE 1-continued

| Organic Clay | 7.6 lbs. |
| --- | --- |

TABLE 2

| 12% cobalt Alkanoate | 0.2 gal. |
| --- | --- |
| 6% Calcium Alkanoate | 0.5 gal. |
| 18% Zirconium Drier | 0.3 gal. |
| Methyl ethyl ketoxime | 0.3 gal. |

EXAMPLE 2

To demonstrate the importance of preventing wax breakdown during the manufacturing of the coatings of this invention two test coatings were formulated, designated as Coatings A and B. Coating A was prepared following the manufacturing procedure described in Example 1 except that a Fischer-Tropsch wax was substituted for the polypropylene wax. Coating B was prepared following the same procedure as used for Coating A except that the wax was added to the first mixture prior to grinding, thus effecting wax breakdown. Both coatings were applied to a wood substrate and evaluated for intercoat adhesion performance using ASTM test method No. D3359. The test results shown in Table 3, presented as percent intercoat failure, show that Coating A, made in accordance with the invention, exhibits virtually no intercoat adhesion failure.

TABLE 3

| Drying Time of of Second Coat | Percent Intercoat Adhesion Failure | |
| --- | --- | --- |
|  | 24 hr. | 10 days |
| Coating A | 1% | 0% |
| Coating B | 68.5% | 65% |

I claim as my invention the following:

1. A protective coating for wood having water resistant properties comprising an admixture of alkyd resin, polytetrafluoroethylene and microcrystalline wax uniformly dispersed in an organic solvent.

2. The coating of claim 1 additionally comprising pigment.

3. The coating of claim 2 wherein the organic solvent is selected from the group consisting of mineral spirits VM & P naphtha, mixed xylenes, toluene, and mixtures thereof, the solvent comprising from about 30 to about 45 weight percent of the coating.

4. The coating of claim 1 further characterized in that the alkyd resin is a medium oil length soya alkyd comprising from about 20 to about 40 weight percent of the coating.

5. The coating of claim 4 further characterized in that the medium oil length soya alkyd is synthesized from pentaerythritol, phthalic anhydride, and soybean oil.

6. The coating of claim 1 further characterized in that the polytetrafluoroethylene comprises from about 0.01 to about 0.1 weight percent of the coating.

7. The coating of claim 1 further characterized in that the microcrystalline wax is selected from the group consisting of polyethylene, polypropylene, Fischer-Tropsch waxes and combinations thereof.

8. The coating of claim 6 further characterized in that the microcrystalline wax comprises from about 0.25 to about 1 weight percent of the coating.

9. A protective waterproof coating for wood comprising a uniformly dispersed mixture of;
   (a) from about 20 to about 40 weight percent of a medium oil length soya alkyd resin;
   (b) from about 0.01 to about 0.1 weight percent polytetrafluoroethylene;
   (c) from about 0.25 to about 1.0 weight percent of microcrystalline wax selected from the group consisting of polyethylene, polypropylene, Fischer-Tropsch waxes and combinations thereof;
   (d) from about 30 to about 45 weight percent of a solvent selected from the group consisting of mineral spirits, VM & P naphtha, mixed xylenes, toluene, and mixtures thereof; and
   (e) from about 20 to about 40 weight percent pigment, wherein congealing of the wax is prevented by quickly slurring the wax with a portion of the solvent prior to combination with the polytetrafluoroethylene.

10. A process for the preparation of a uniformly dispersed protective coating for wood having water resistant properties comprising, in combination, the steps of
    (a) preparing a first mixture comprising organic solvent, polytetrafluoroethylene, pigment, and alkyd resin;
    (b) dispersing the first mixture to produce a uniform dispersion of polytetrafluoroethylene, pigment and alkyd resin having a dispersion of at least 4 Hegman;
    (c) preparing a second mixture comprising organic solvent and microcrystalline wax;
    (d) quickly slurrying the second mixture at temperature below 130° F. and at a shear sufficient to ensure a uniformly dispersed mixture without effecting congealing of the microcrystalline wax; and
    (e) combining the second mixture with the first mixture with blending to a uniform dispersion.

* * * * *